Nov. 17, 1936.                L. C. WATERMAN                2,060,839
                    ELECTRIC TREATING SYSTEM FOR EMULSIONS
                              Filed Nov. 27, 1934
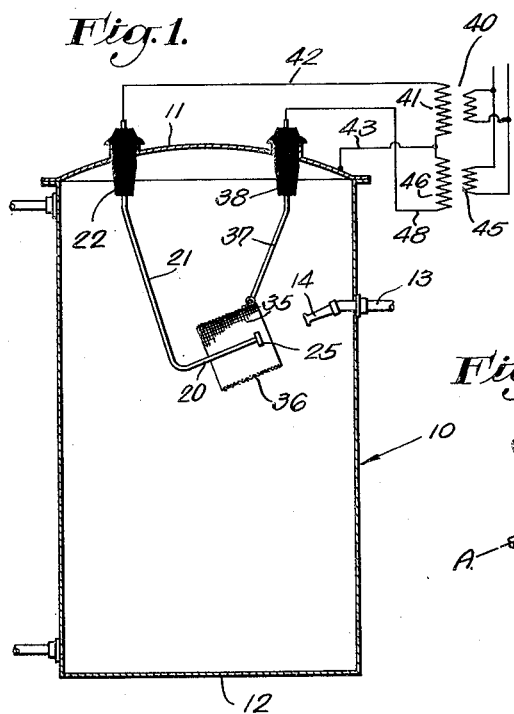
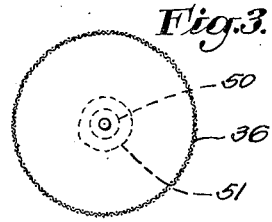
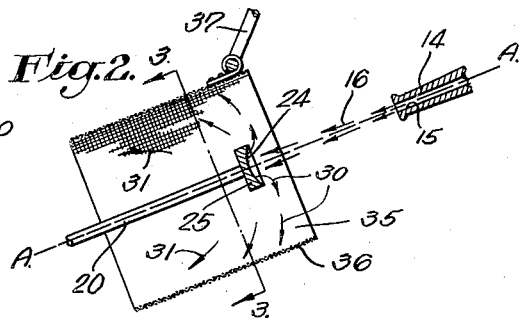
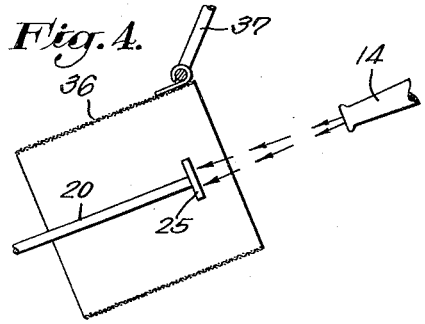
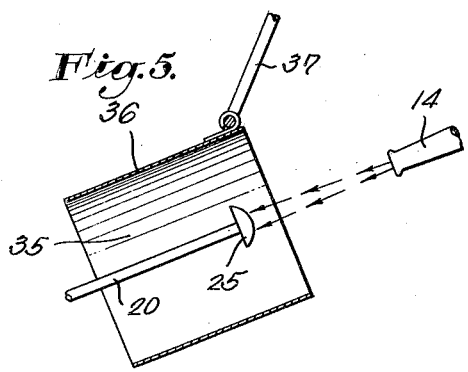
INVENTOR:
LOGAN C. WATERMAN,
By Fad W Lamin
ATTORNEY.

Patented Nov. 17, 1936

2,060,839

UNITED STATES PATENT OFFICE 2,060,839

ELECTRIC TREATING SYSTEM FOR EMULSIONS

Logan C. Waterman, Long Beach, Calif., assignor to Petroleum Rectifying Company of California, Los Angeles, Calif., a corporation of California Application November 27, 1934, Serial No. 754,997

5 Claims. (Cl. 204—24)

My invention relates to a novel method and apparatus for treating liquids, and more particularly emulsions or mixtures of a plurality of liquids associated in a more or less intimate manner.

With certain emulsions it has been found desirable in the electric treatment thereof to move this emulsion from one electrode toward another electrode of different potential. It is an object of the present invention to provide a novel method and apparatus for accomplishing this result.

It is a further object of the present invention to provide a novel method and apparatus for rapidly vibrating an electrode, usually an electrode adjacent which the field is highly concentrated, thus enlarging the effective area of the treating zone adjacent this electrode.

It is a further object of the present invention to provide a novel method and apparatus in which a stream of the liquid to be treated is moved into impinging contact with an end surface of an electrode in such a manner that the liquid spreads upon contacting this end surface.

It is a further object of the present invention, in at least one embodiment thereof, to electrically treat the emulsion in such a stream before impingement to preliminarily coalesce at least certain of the dispersed particles thereof, so that upon such impingement, these coalesced particles are brought into engagement with each other and with the impinging surface.

However, the invention comprehends electric treatment of the emulsion either prior, during, or after impingement, or various combinations of these positions of treatment.

The invention also includes certain other novel elements or novel placements or combinations thereof, which will be apparent to those skilled in the art from the following description in which the advantages of my construction are set forth in detail.

Referring to the drawing:

Fig. 1 is a vertical sectional view of a dehydrator incorporating one form of the invention.

Fig. 2 is an enlarged sectional view of a portion of the treater shown in Fig. 1.

Fig. 3 is a sectional view taken on the line 3—3 of Fig. 2.

Figs. 4 and 5 illustrate alternative forms of construction.

Referring particularly to Fig. 1 I have shown a tank 10 enclosing certain of the novel elements of the present invention, this tank being closed at its upper end by an upper wall 11, and at its lower end by a lower wall 12. The dispersed particles are herein treated to effect coalescence so that the phase liquids gravitationally separate therein and can be separately withdrawn in the usual manner from the upper and lower ends of the tank. The liquid to be treated is introduced through a pipe 13 which communicates with a nozzle 14 positioned in the tank and including an unobstructed orifice 15, best shown in Fig. 2. The emulsion or other liquid to be treated, is discharged from this orifice in the form of a smooth-flowing solid stream moving along an axis A—A as indicated by the arrows 16 of Fig. 2.

For any one of the various reasons to be hereinafter set forth, it is often desirable to spread this stream of emulsion to move outwardly away from the axis A—A. In the embodiment shown in Figs. 1 and 2, this is accomplished by the use of a rod electrode 20 suitably secured to a supporting means 21 insulated from the tank 10 by a bushing 22. The forward end of the rod electrode 20 provides an end electrode surface 24 which may be formed directly on the forward end of this rod electrode but which is preferably formed by an enlarged head 25 on the forward end thereof. This end surface 24 is preferably of a peripheral shape corresponding to the geometrical shape of the orifice 15, a circular orifice and a circular head 25 giving very desirable results. The rod electrode 20 is substantially centered on the axis A—A so that the transversely-extending end surface 24 is in the path of travel of the emulsion stream. This forwardly directed end surface 24 may be concaved forwardly as indicated in Fig. 2 to present a concave surface against which the surface impinges. In other instances a plane surface may be used as indicated in Fig. 4. In still other instances, this end surface may be of a shape which is convexed forwardly, as indicated in Fig. 5. Best results are usually obtained, however, with a concave or plane surface.

The velocity of the stream of emulsion discharged from the nozzle 14 is sufficiently great to cause a marked spreading action upon impingement with the end surface 24. This action is indicated by the arrows 30 of Fig. 2. It will be clear that while it is desirable to substantially equally spread the emulsion on all sides of the axis A—A, this spreading action is not necessarily confined to an outward movement in a plane perpendicular to the axis A—A. While certain portions of the stream are spread to move substantially in this plane, other portions may move rearwardly as indicated by the arrows 31.

This system of spreading the incoming emulsion has numerous advantages. In the first place it will be clear that, in the absence of the head 25, the emulsion in the stream would continue to flow along and in close proximity with the periphery of the electrode 20, especially if the forward end of this electrode were pointed. With many emulsions, however, better treatment will be obtained if, by such a spreading action, the emulsion is displaced from the vicinity of the rod electrode 20. Thus, in the embodiment shown, the spreading emulsion constituents move into a treating space 35 defined around the electrode 20 by an outer or sleeve electrode 36 suitably retained by a support means 37 insulated from the tank by a bushing 38 so that an intense electric field can be maintained therein.

With many emulsions I have found it preferable to spread the incoming stream sufficiently to cause the emulsion to substantially bridge the treating space 35. In this event the emulsion constituents may move quickly across this treating space and into the zone immediately inside the outer electrode 36. In some instances it is desirable to make this outer electrode of interstitial character so that the emulsion constituents treated in the treating space 35 can move directly from this treating space through the interstices of this electrode and into an auxiliary field therearound. If this action is desirable on the particular emulsion undergoing treatment, the outer electrode can be made of screen as indicated in Fig. 2. It will be clear, however, that it is not necessary in all instances to dispose the outer electrode 36 so close to the rod electrode 20 that the spreading emulsion constituents completely bridge this treating space.

In the second place, this impinging-spreading action may be made to accomplish new results when treating emulsions. Thus, if the emulsion in the stream discharged from the nozzle 14 is electrically treated prior to the time that it impinges against the end electrode surface 24, the preliminarily coalesced particles of the dispersed phase of the emulsion will be further coalesced due to the impinging action. This will be clear from a consideration of the fact that the preliminarily coalesced particles tend to "pile up" immediately in front of the end electrode surface 24, and thus tend to come into pressural contact with each other. This pressural engagement tends to rupture the minute films surrounding the individual particles, thus causing further coalescing thereof. So also, when a given particle comes into surface contact with the end electrode surface 24 its spherical shape is materially distorted, this particle tending to flatten out against this surface. In so doing, the interfacial forces are changed so that the particle is more susceptible to a coalescing action than would be the case if the spherical form thereof were maintained. In addition, this elongating action upon contact flattens the coalesced particle so that it can come into coalescing contact with other particles adjacent thereto which are impinging at the same instant or which have previously impinged on the end electrode surface 24.

Various means may be utilized for thus preliminarily coalescing the dispersed particles of the emulsion prior to impact. If desired, an electric field may be established around the stream of emulsion to act in this regard. Preferably, however, I maintain a potential difference between the nozzle 14 and the rod electrode 20. This may be accomplished by the use of a transformer 40 which provides a secondary winding 41 one terminal of which is connected to the rod electrode 20 by a conductor 42, the other terminal being grounded to the tank 10 through a conductor 43. An electric field is thus established between the nozzle and the end electrode surface 24, this field acting to treat the emulsion in the stream. The intensity of the field is preferably such that the dispersed particles of the incoming emulsion are at least partially coalesced before impingement, thus accomplishing the desirable results set forth above.

In the embodiment of the invention shown in Figs. 1 and 2, it will be clear that the emulsion constituents may be subjected to additional electrically-established coalescing tendencies during impingement and subsequent thereto. This is accomplished by establishing a high intensity electric field in the treating space 35. A transformer 45 may be used in this connection, a secondary winding 46 thereof providing one terminal which is grounded to the tank through the conductor 10 43 and providing another terminal which is connected through a conductor 48 to the outer electrode 36. If desired, the windings 41 and 46 of the two transformers may be connected in additive relation. Assuming transformers of substantially identical rating, such a system will develop between the electrodes 20 and 36 a potential difference which is twice as great as the potential difference between the electrode 20 and nozzle 14, for instance, or in the auxiliary treating space between the electrode 36 and the tank. Such a construction is often desirable in that it permits subjection of the emulsion after spreading to a field of higher potential difference than the field between the nozzle 14 and the end electrode surface 24. However, other methods of energizing the separate fields may be utilized without departing from the spirit of this invention.

A third advantage of this impinging-spreading action lies in the opportunity which it offers for vibrating the rod electrode 20 and the end electrode surface 24. Consider first the advantages accruing from vibration of this end electrode surface. If this surface is not vibrated, and if the center thereof is in the axis A—A, it will be clear that the emulsion will be spread outward in equal amount in all directions from the axis A—A. However, if this surface is displaced slightly from this central position, a slightly greater amount of the emulsion will be discharged on one side of this axis as compared to the amount discharged on the other side thereof. This is especially true if a convex or concave end surface 24 is utilized. A slight change in the angular position of this surface as effected, for instance, by a vibration of the electrode 20, will also influence this consideration, even if a plane surface 24 is utilized. A further factor which influences this action involves frictional consideration. The friction between the emulsion constituents and the end surface 24 will be less on that side of the surface away from which this surface is moved in its displacement from its central position. An increased amount of the spreading constituents will thus move from this side of the end surface 24. Vibration of this end surface 24 will cause a relatively rapid shift in position thereof, resulting in correspondingly rapid changes in the quantitative distribution of the spreading emulsion constituents. Improved results accrue from this rapid shifting of this electrode surface 24.

Such a vibration of the rod electrode 20 is also advantageous in rapidly changing the character of the field in the treating space 35. With concentric electrodes 20 and 36, the most intense portion of the field is immediately around the inner electrode, in this case the electrode 20. Aside from any of the already-treated constituents, the treating space 35 is filled with material which should undergo further treatment. The zone of high field intensity immediately around the electrode 20 is important in this regard. In Fig. 3 this zone is indicated by dotted lines 50, but, due to the relatively small size of the rod electrode 20, this zone is relatively small. If, however, the rod electrode is rapidly vibrated its random movement will move the zone 50 so that it covers a greater proportion of the treating space 35. Thus, when the electrode is vibrated, this zone will cover an effective area within the dotted circle 51 of Fig. 3. Vibration of the electrode 20 thus results in a better treating action in the treating space 35.

This vibrating action is assisted by utilizing a concave end electrode surface 24, though the vibrating action will also take place if a plane or convex surface is utilized. Thus, in the present invention, the incoming emulsion can be used for setting up this vibratory action, though other means can be used in this regard if desired. The rod electrode 20 is preferably of resilient construction. The term "resilient rod electrode" has been used to define not only a rod electrode 20 which is itself resilient, but a rod electrode which is resiliently mounted to permit vibration thereof. The support means 21 may be designed to thus resiliently support the electrode 20, though preferably this support means is made rigid and the rod electrode 20 itself is made resilient.

It will be understood that the embodiment of the invention herein disclosed in detail includes several novel features used in conjunction with each other. However, the invention is not limited to this combined use. Thus, it is sometimes possible to dispense with the outer electrode 36, utilizing only the treating action between the nozzle and the end electrode surface 24. In other instances the treating action in the treating space 35 can be exclusively used, eliminating any potential difference between the electrode 20 and the nozzle 14. Further, the impinging-spreading function of the apparatus may be used in various capacities, being capable of beneficial use with treating systems other than that shown herein. Other modifications will be apparent to those skilled in the art. It will be further clear that the present invention includes novel method concepts as well as novel structural concepts.

Although I have described one embodiment of my invention in detail, it is to be understood that this disclosure is illustrative rather than restrictive, and that changes and modifications may be made therein without departing from the spirit and scope of the claims appended hereto.

I claim as my invention:

1. In an electric treater for emulsions, the combination of: a rod electrode providing an end electrode surface disposed transversely with respect to the axis of said rod electrode and being of a shape concaved forwardly; a nozzle spaced forward along said axis from said electrode surface and directing a stream of emulsion along said axis into impinging relation with said electrode surface, whereby said stream spreads outward from said axis upon impingement with said surface and is thus prevented from flowing smoothly along the rear portion of said rod electrode; and means for electrically treating said emulsion to coalesce the dispersed particles thereof.

2. In an electric treater for emulsions, the combination of: a live electrode providing an end surface disposed transversely with respect to a given axis; means for directing a high-velocity stream of emulsion along said axis and into impinging relationship with said end surface whereby said emulsion spreads outward on all sides of said axis upon impingement with said end surface; and means for electrically treating the emulsion in said stream and after it has moved from the periphery of said end surface to coalesce the dispersed particles thereof into masses of greater size, said means including a live foraminous sleeve electrode around said end surface but spaced therefrom so that said end surface lies within said foraminous sleeve electrode and including means for establishing an electric field between said live electrode and said foraminous sleeve electrode whereby said spreading emulsion is treated by the field between said live sleeve electrode and said live electrode providing said end surface, at least a portion of the emulsion moving outward through the foraminous sleeve electrode.

3. In an electric treater for emulsions, the combination of: a foraminous sleeve electrode; a rod electrode providing an enlarged head on one end thereof, said rod electrode extending into one end of said foraminous sleeve electrode to position said enlarged head inside said sleeve electrode; nozzle means for flowing a high-velocity stream of emulsion into the other end of said sleeve electrode and along the projected axis of said rod electrode in a direction toward said enlarged head to impinge against said enlarged head and spread toward said sleeve electrode, at least a portion of the emulsion flowing outward through said foraminous sleeve electrode; and means for establishing an electric field between said foraminous sleeve electrode and said rod electrode and its enlarged head to treat the spreading emulsion.

4. In combination in an electric treater for emulsions: a foraminous sleeve electrode; electrode means in said foraminous sleeve electrode and providing an end surface disposed therein; means flowing a stream of emulsion from a position outside said foraminous sleeve electrode through an unobstructed space toward said end surface to impinge against said end surface and spread toward said sleeve electrode, at least a portion of the spreading emulsion flowing outward through said foraminous sleeve electrode; and means establishing a potential difference between said electrode means and said sleeve electrode to establish an electric field therebetween of sufficient intensity to coalesce the dispersed phase of the spreading emulsion.

5. A method of treating an emulsion by the use of a resilient electrode means providing an end surface, which method includes the steps of: vibrating said electrode by flowing a high-velocity stream of said emulsion from a position spaced from said electrode means directly toward said end surface, the axis of said stream substantially centrally intersecting said end surface whereby said stream of emulsion impinges against said end surface to vibrate said electrode means and spread said stream from the peripheral portion of said end surface, vibration of said electrode means displacing said end surface so that the axis of said stream does not intersect said surface substantially centrally thus varying the amount of emulsion spreading from the peripheral portions of said end surface from time to time; establishing an electric field adjacent said electrode means of sufficient intensity to coalesce the dispersed phase of said emulsion; and separating the coalesced dispersed phase of said emulsion from the continuous phase thereof.

LOGAN C. WATERMAN.